US006874233B2

(12) United States Patent
Harding

(10) Patent No.: US 6,874,233 B2
(45) **Date of Patent: *Apr. 5, 2005**

(54) METHODS AND SYSTEMS FOR THE CONTINUOUS IN-LINE COATING AND FABRICATION OF HOOP STEEL REBAR FOR CONCRETE STRUCTURES

(76) Inventor: Richard D. Harding, 101 Midco Rd., Pearl, MS (US) 39288

( * ) Notice: Subject to any disclaimer, the term of this patent is extended or adjusted under 35 U.S.C. 154(b) by 0 days.

This patent is subject to a terminal disclaimer.

(21) Appl. No.: 10/671,604

(22) Filed: Sep. 29, 2003

(65) Prior Publication Data

US 2004/0058086 A1 Mar. 25, 2004

Related U.S. Application Data

(63) Continuation of application No. 09/973,806, filed on Oct. 11, 2001, now Pat. No. 6,691,414.

(51) Int. Cl.[7] .................................................. B23P 17/00

(52) U.S. Cl. ........................ 29/897.34; 29/452; 29/458; 72/135; 72/170

(58) Field of Search ......................... 29/407.01, 407.05, 29/452, 458, 527.2, 460, 709, 714, 819; 72/135, 145, 170, 171

(56) References Cited

U.S. PATENT DOCUMENTS

| | | | |
|---|---|---|---|
| 3,210,838 A | 10/1965 | Nast et al. | 29/407 |
| 3,226,817 A | 1/1966 | Simborg et al. | 29/430 |
| 3,965,551 A | 6/1976 | Ostrowski | |
| 4,621,399 A | 11/1986 | Qureshi et al. | |
| 4,799,373 A | 1/1989 | Benton | |
| 4,918,958 A | 4/1990 | Glomb et al. | |
| 5,151,147 A | 9/1992 | Foster et al. | |
| 6,691,414 B2 * | 2/2004 | Harding | 29/897.34 |

FOREIGN PATENT DOCUMENTS

| | | | |
|---|---|---|---|
| JP | 63168229 A | 7/1988 | B21D/7/08 |

* cited by examiner

*Primary Examiner*—David P. Bryant
*Assistant Examiner*—Jermie E. Cozart
(74) *Attorney, Agent, or Firm*—Nixon & Vanderhye P.C.

(57) ABSTRACT

Methods and systems are provided for the continuous coating and fabrication of spiraled steel rebar product for concrete structures. Specifically, methods and systems are provided by which linear uncoated rebar is supplied to a polymeric (preferably, epoxy) powder-coating unit whereby a substantially uniform coating layer of a polymeric material is applied onto the uncoated rebar to form a linear coated rebar; and thereafter the linear coated rebar is bent into a spiraled steel rebar product. The bending unit employed to bend the linear coated rebar includes a series of bending wheels having separated upstream and downstream bending wheels and a central bending wheel which is disposed between and below these upstream and downstream bending wheels. By bringing the linear coated rebar into contact with the series of bending wheels, the rebar may be bent gently into spiraled steel rebar product without damage to the polymeric surface coating. In this regard, it has been found that such gentle bending of the coated rebar may be advantageously accomplished using bending wheels which include a rubber-like tire mounted on a rigid rotatable wheel member.

41 Claims, 2 Drawing Sheets

Figure 1:
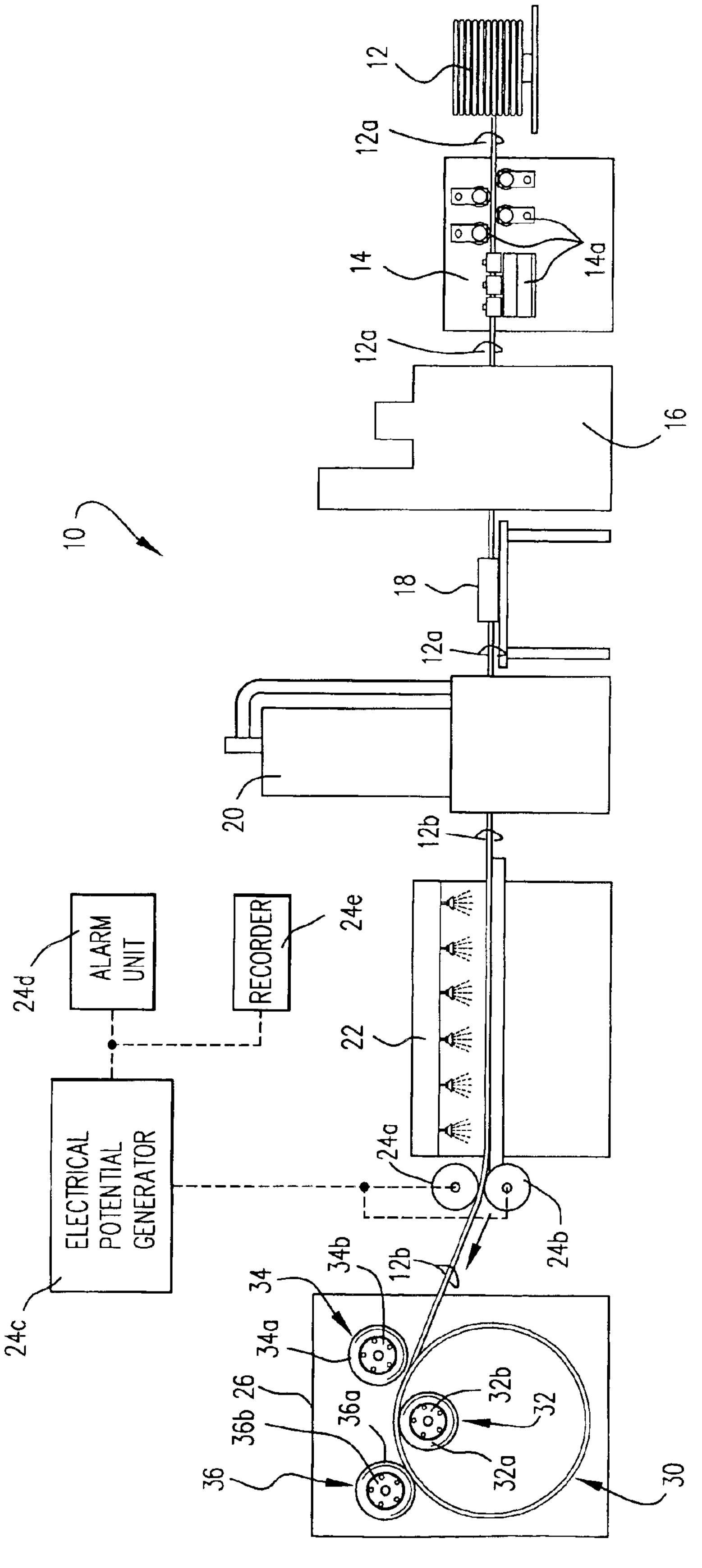

METHODS AND SYSTEMS FOR THE CONTINUOUS IN-LINE COATING AND FABRICATION OF HOOP STEEL REBAR FOR CONCRETE STRUCTURES

This application is a continuation of application Ser. No. 09/973,806 filed Oct. 11, 2001, now U.S. Pat. No. 6,691,414.

FIELD OF THE INVENTION

The present invention generally relates to methods and systems for the continuous in-line coating of bent concrete rebar products, known as "spirals" or "spiraled steel".

BACKGROUND AND SUMMARY OF THE INVENTION

It is notoriously well known to employ steel or other metal reinforcing rods or bars known colloquially as "rebar" to reinforce structural members formed of cementitious materials, such as concrete, so as to improve the concrete structure's tensile strength. Although steel and other metal rebar can in fact enhance the tensile strength of the concrete structure, they are susceptible to oxidation. For example, ferrous metal rusts by the oxidation thereof to the corresponding oxides and hydroxides or iron by atmospheric oxygen in the presence of water.

Steel rebar within a concrete structure remains passive provided that the concrete remains highly alkaline. That is, since concrete is typically poured at a pH of 12 to 14 (i.e., at high alkalinity) due to the presence of hydroxides of sodium, potassium and calcium formed during the hydration of the concrete, oxidation of the steel rebar is typically not a concern in the short term. However, over time, exposure to a strong acid (such as typically occurs by virtue of chlorine ions from road salt, salt air in marine environments and/or salt-contaminated aggregate (e.g., sand) used to make the concrete) lowers the initial pH of the concrete thereby allowing the steel rebar therein to corrode, for example, by means of an electrolysis effect. When the rebar corrodes, it can expand and create internal stresses in the concrete which ultimately are revealed by cracking and, ultimately disintegration, of the concrete.

It has therefore been conventional practice to coat the rebar with a thermoset epoxy resin coating in order to minimize the rebar's susceptibility to corrosion. The epoxy coating of rebar is not, however, without problems. For example, the epoxy coating on the rebar is highly susceptible to cracking during bending of the rebar to form so-called spiral steel rebar (that is, rebar bent into a generally round or rectangular cross-sectional "hoop" that is tied to vertical linear rebar in concrete columns).

Specifically, cracking of the epoxy coating can and does occur during bending if there exists a less than optimum state of cleanliness of the rebar resulting in an insufficient anchor profile patter of the surface of the bar to hold the coating, or if the coating thickness is uneven (i.e., to thin or too thick from optimum thickness. For these reasons, the spiral steel rebar is typically first formed into the desired geometric hoop configuration, and then subjected to a powder-coating operation whereby a shot blasting process (i.e., to create a roughened surface, or anchor profile on the steel) precedes a thermoset epoxy resin powder coating operation onto the anchor-profiled rebar surfaces.

Such batch coating of pre-formed spiraled steel however is problematic in that uneven blasting and/or coating thickness of the rebar along its interior typically ensues thereby leading to premature corrosion problems in use. That is, the nature of a reinforcing bar pre-formed into a spiral configuration of virtually any dimension causes problems during preparation and coating on the interior of the spiral shaped material. For example, the distance of the interior portions of the spiral shaped rebar material from both the blast heads and/or powder coating apparatus, as well as the inevitable masking of the interior portions of the spiral by the exterior portions thereof, typically contribute to unsatisfactory and/or uneven coatings. Thus, the epoxy coating thickness on the interior of the spiraled steel tends to be less than the exterior due to masking effects during the powder coating operation.

It would therefore be highly desirable if methods and systems were provided to allow spiraled steel rebar to be reliably and evenly epoxy-coated. It is towards fulfilling such a need that the present invention is directed.

Broadly, therefore, the present invention is embodied in methods and systems for the continuous coating and fabrication of spiraled steel rebar product for concrete structures. In especially preferred forms, the present invention includes methods and systems by which linear uncoated rebar is supplied to a polymeric (preferably, epoxy) powder-coating unit whereby a substantially uniform coating layer of a polymeric material is applied onto the uncoated rebar to form a linear coated rebar; and thereafter the linear coated rebar is bent into a spiraled steel rebar product. The spiraled steel rebar product of this invention could be fabricated in virtually any desired size. Thus, for example, the spiraled steel rebar product of the present invention may be in the form of a continuous steel rebar having between about 40 to about 50 spiral turns and weighing up to about 4000 pounds.

The bending unit employed to bend the linear coated rebar is provided with a series of bending wheels comprised of separated upstream and downstream bending wheels and a central bending wheel which is disposed between and below these upstream and downstream bending wheels. By bringing the linear coated rebar into contact with the series of bending wheels, the rebar may be bent gently into spiraled steel rebar product without damage to the polymeric surface coating. In this regard, it has been found that such gentle bending of the coated rebar may be advantageously accomplished using bending wheels which include a synthetic or natural rubber tire mounted on a rigid rotatable wheel member.

These and other aspects and advantages of the present invention will become more clear after careful consideration is given to the following detailed description of the preferred exemplary embodiments thereof which follow.

BRIEF DESCRIPTION OF THE ACCOMPANYING DRAWINGS

Figure 2:
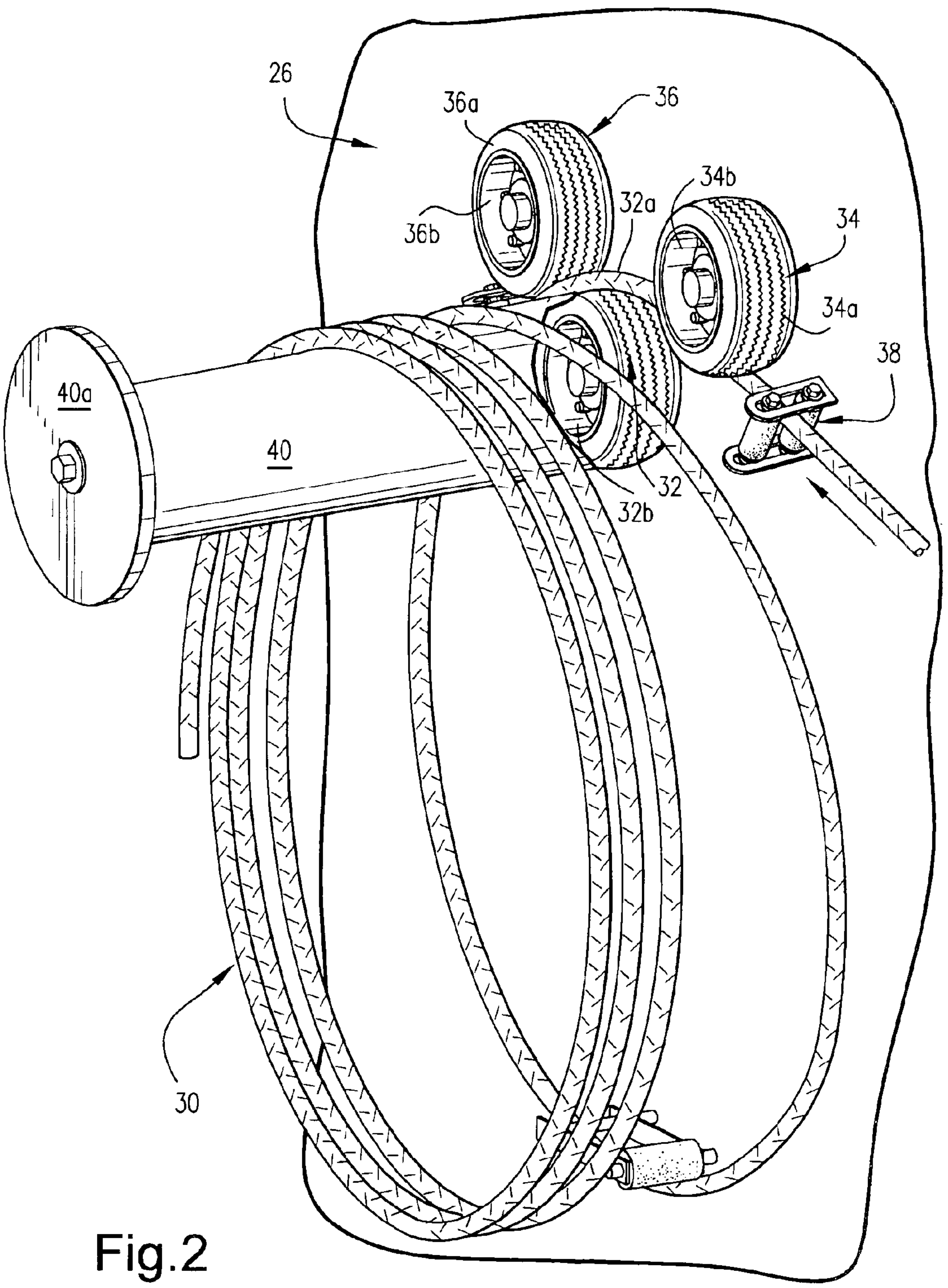

Reference will hereinafter be made to the accompanying drawings wherein like reference numerals throughout the various FIGURES denote like structural elements, and wherein, FIG. 1 is a schematic side elevational view showing a particularly preferred system for the continues epoxy-coating of spiraled steel rebar; and FIG. 2 is an enlarged perspective view of the rebar spiraled bending unit in accordance with the present invention.

DETAILED DESCRIPTION OF THE INVENTION

Accompanying FIG. 1 schematically depicts one presently preferred system 10 for continuously coating steel rebar with a thermosetting epoxy powder and forming the coated rebar into spiraled steel. Specifically, as shown therein, the uncoated rebar 12*a* is typically provided in a coil 12. By way of example only, the rebar may be #5 ⅝-inch diameter rebar. Virtually any other size of rebar, however, may be coated satisfactorily according to the present invention. The rebar 12*a* is uncoiled from the supply coil 12 and fed to a bar straightener 14 provided with a series of rollers 14*a* which serve to remove coil-shape memory from the rebar 12*a* so that it can be processed linearly through the downstream unit operations.

It will be appreciated of course that throughout this specification, reference will be made to "bar" when referencing the steel stock which is employed in the practice of the present invention. It should therefore be understood that such a term is being used in its art-recognized sense to mean generically any elongate steel member of any desired cross-sectional configuration that may be employed as a reinforcement member for cement structures. Thus, the term "bar" encompasses round cross-sectional wire or rods and well as rectangular cross-sectional bars.

A cleaning unit 16 is provided immediately downstream of the bar straightener 14. The cleaning device 16 is most preferably a "dry" cleaner in that it uses rotating vaned wheels which throw an abrasive (e.g., hardened steel grit) at the bar 12*a*. The abrasive force of the grit thereby removes debris and/or surface oxidation from the uncoated rebar 12*a*. In addition, the surface of the rebar is abraded sufficiently by the grit to provide a specified anchor profile to improve the mechanical adherence of the later applied epoxy coating.

The cleaned rebar 12*a* is then directed to a heating unit 18. Most preferably, the heating unit 18 is an induction heating coil which serves to heat the uncoated steel rebar 12*a* to an elevated temperature of about 475° F. as it passes therethrough. The rebar 12*a* thus enters the powder-coating unit 20 at an elevated temperature sufficient to fusion bond the applied epoxy powder. In this regard, the coating unit 20 most preferably applies the epoxy powder electrostatically onto the heated steel rebar 12*a* using electrostatic spray guns in a manner well known to those in this art. The electrostatically applied epoxy powder will thus coat the exterior surface of the rebar 12*a* and will fuse so as to form a uniform layer of epoxy resin on all of the rebar's surfaces.

The epoxy-coated rebar (now identified as reference numeral 12*b*) exits the powder-coating unit 20 and is directed to a quench chamber 22. In this regard, it is important for the epoxy coating layer to cure prior to being subjected to the water spray within the quench chamber 22. Thus, the distance between coating unit 20 and the quench chamber 22 must be sufficient at the linear run rate of the coated rebar 12*b* to allow for sufficient curing to ensue. Most preferably, the epoxy coating on the coated rebar 12*b* is allowed to cure for about 30 seconds prior to entering the quench chamber 22. As briefly noted above, the quench chamber 22 sprays water onto the surface of the epoxy-coated rebar so as to cool it to a sufficiently low temperature which would allow manual worker handling of the coated rebar without injury.

The cooled and epoxy-coated rebar 12*b* is passed through the nip of an opposed set of wet sponges 24*a*, 24*b* which are charged with a low voltage for an electrical potential generating unit 24*c*. Should a hole (colloquially known in this art as a "holiday") or defect occur in the coating, an electrical circuit is completed through the rebar which is detected by the alarm unit 24*d* which causes an audible and/or visual alarm to be generated that may be recorded by the defect recorder unit 24*e*. As a result, the number of defects of the entirety of the spiraled coated rebar product may be determined.

The spiral forming unit 26 serves to bend the linear epoxy-coated rebar 12*b* into a non-linear curved hoop so as to form a continuous spiraled steel product 30 as is perhaps better shown in accompanying FIG. 2. Specifically, the spiral forming unit 26 is provided with a central bending wheel 32 which is disposed between, but vertically lower than upstream and downstream bending wheels 34, 36, respectively. Most preferably each of the bending wheels 32, 34 and 36 is a rubber-like (e.g., synthetic rubber) tire 32*a*, 34*a* and 36*a* mounted on a rigid inner wheel 32*b*, 34*b* and 36*b*. A guide roll assembly 38 is provided so as to guide the advancing coated rebar 12*b* into the bending unit 26.

A support spool 40 for supporting the spiraled steel 30 during its formation is connected to and extends coaxially outwardly from the central bending wheel 32 in a cantilevered manner. The support spool 40 is provided with a flange member 40*a* at its free terminal end so as to prevent the spiraled steel from slipping off the spool 40.

As may be better depicted in accompanying FIG. 1, the coated rebar 12*b* is introduced into the bending unit 26 in an orientation that is substantially tangential to both the upstream and central bending wheels 32, 34, respectively. It will be noted in this regard, that the upstream bending wheel 34 is vertically offset from (i.e., higher than) both the central bending wheel 32 and the downstream bending wheel 36. This amount of vertical off-set and the horizontal spacing between the upstream and downstream bending wheels will therefore determine the radius of curvature imparted to the incoming rebar 12*b*, and hence the diametrical size of the spiraled steel 30. It will, of course, be understood that relative adjustment of the positional relationships between these bending wheels 32, 34 and/or 36 as well as providing additional bending wheels will allow the fabricator to form spiraled steel products of different diameters and/or geometric configurations. Thus, for example, the bending unit 26 may be modified by adding additional bending wheels similar to those described above so as to form generally rectangular spiraled steel products.

The pliant nature of the tires 32*a*, 34*a* and 36*a* allows the incoming linear coated rebar 12*b* to be gently bent into a spiraled steel product without damage to the epoxy coating thereon. Thus, in accordance with the present invention, a spiraled steel product may be fabricated having a uniform epoxy coating layer on all sides of the rebar's circumference and along the rebar's entire length. This, in turn, results in spiraled steel having greater resistance to corrosion in the field and thereby improved structural reliability.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of continuously coating and fabricating spiraled steel rebar product for concrete structures comprising the sequential steps of:

(a) supplying a linear uncoated rebar to a polymeric powder-coating unit;

(b) applying a substantially uniform coating layer of a polymeric material onto the uncoated rebar to form a linear coated rebar; and thereafter (c) bending the linear coated rebar into a spiraled steel rebar product, wherein between steps (a) and (b) there is practiced the step of, (a1) abrading the surface of the linear uncoated rebar by directing a dry grit against the surface of the linear uncoated rebar with sufficient abrasive force to remove surface debris and/or oxidation therefrom and to provide a desired anchor profile to improve mechanical adherence of the coating layer of polymeric material.

2. The method of claim 1, wherein step (c) includes bending the linear coated rebar by bringing the linear coated rebar into contact with a series of bending wheels comprised of separated upstream and downstream bending wheels and a central bending wheel which is disposed between and below said upstream and downstream bending wheels.

3. The method of claim 2, wherein step (c) is practiced using bending wheels which include a rubber tire mounted on a rigid rotatable wheel member.

4. The method of claim 3, wherein step (a) includes the step of (a2) heating the uncoated rebar to an elevated temperature sufficient to fuse an epoxy powder, and wherein step (b) includes the step of (b1) electrostatically spray coating the heated and uncoated rebar with the epoxy powder and allowing the epoxy powder to fuse to thereby form a coated rebar having a substantially uniform coating of epoxy, and thereafter (b2) curing the epoxy coating on the coated rebar.

5. The method of claim 4, wherein after step (b2) and before step (c), there is practiced subjecting the coated rebar to a water quench.

6. The method of claim 4, wherein step (a2) is practiced by passing the uncoated rebar through an induction heater.

7. The method of claim 6, wherein the rebar is heated to a temperature of at least about 450° F.

8. The method of claim 4, wherein prior to step (a1), there is practiced the step of uncoiling the uncoated rebar from a supply coil thereof.

9. The method of claim 8, wherein step (a1) includes the step of (a3) straightening the uncoiled and uncoated rebar.

10. The method of claim 1 or 4, which further includes between steps (b) and (c) the step of determining defects in the epoxy coating.

11. A system for the continuous coating and fabrication of spiraled steel rebar product for concrete structures comprising:

(a) a polymeric powder-coating unit which receives uncoated linear rebar and applies a substantially uniform coating layer of a polymeric material onto exterior surface of the uncoated rebar to form a linear coated rebar; and (b) a bending unit for bending the linear coated rebar into a spiraled steel rebar product; and (c) an abrading unit disposed upstream of the coating unit for directing a dry grit against a surface of the linear uncoated rebar with sufficient abrasive force to remove surface debris and/or oxidation therefrom and to provide a desired anchor profile to improve mechanical adherence of the coating layer of polymeric material.

12. The system of claim 11, wherein the bending unit includes a series of bending wheels which contact the linear coated rebar during bending, said series of bending wheels being comprised of separated upstream and downstream bending wheels and a central bending wheel which is disposed between and below said upstream and downstream bending wheels.

13. The system of claim 12, wherein the upstream, downstream and central bending wheels include a rubber tire mounted on a rigid rotatable wheel member.

14. The system of claim 13, which further comprises (a1) a heating unit for heating the uncoated rebar to an elevated temperature sufficient to fuse an epoxy powder, and (a2) a coating unit for electrostatically spray coating the heated and uncoated rebar with the epoxy powder and allowing the epoxy powder to fuse to thereby form a coated rebar having a substantially uniform coating of epoxy.

15. The system of claim 14, further comprising a quench cabinet downstream of said coating unit for spraying the coated rebar with a water quench.

16. The system of claim 14, wherein the heating unit includes an induction heater.

17. The system of claim 16, wherein the inducting heater is capable of heating the uncoated rebar to a temperature of at least about 450° F.

18. The system of claim 14, comprising a rebar straightener for straightening uncoated rebar which is uncoiled from a supply coil thereof.

19. The system of claim 11 or 15, which further includes a coating defect detection system for determining defects in the coating layer of polymeric material.

20. The system of claim 11, wherein the bending unit includes a support spool which is connected to and extends coaxially outwardly from the central bending wheel in a cantilevered manner.

21. A method of continuously coating and fabricating spiraled steel rebar product for concrete structures comprising the steps of:

(a) providing a supply coil of uncoated rebar;

(b) uncoiling the uncoated rebar from the supply coil thereof and removing coil-shape memory from the uncoiled and uncoated rebar to provide linear uncoated rebar;

(c) supplying the linear uncoated rebar to a polymeric powder-coating unit and electrostatically spray-coating a substantially uniform coating layer of a polymeric coating material onto the uncoated rebar to form a linear coated rebar; and thereafter (d) bending the linear coated rebar into a spiraled steel rebar product; wherein (e) prior to electrostatically spray-coating the uncoated rebar, there is practiced the steps of (i) abrading the uncoated rebar surface to achieve a desired anchor profile for the polymeric coating material, and (ii) heating the uncoated rebar.

22. The method of claim 21, further comprising heating the uncoated rebar to an elevated temperature sufficient to fuse the polymeric powder.

23. The method of claim 21, wherein step (c) is practiced by electrostatically spray-coating the uncoated rebar with an epoxy.

24. The method of claim 23, comprising curing the epoxy coating on the coated rebar.

25. The method of claim 24, comprising after curing, subjecting the coated rebar to a water quench.

26. The method of claim 24, further comprising testing the coated rebar for coating defects.

27. The method of claim 26, wherein said step of testing the coated rebar comprises bringing the coated rebar into contact with wet sponge material charged with an electrical potential.

28. The method of claim 27, wherein said step of testing the coated rebar comprises generating an alarm in response to detection of a coating defect by the electrically charged wet sponge material.

29. A system for continuously coating and fabricating spiraled steel rebar product for concrete structures comprising:

(a) a rebar straightener for uncoiling uncoated rebar from a supply coil thereof and removing coil-shape memory from the uncoiled and uncoated rebar to provide linear uncoated rebar;

(b) an abrading unit for abrading the surface of the uncoated linear rebar to achieve a desired anchor profile for a polymeric coating material;

(c) a polymeric powder-coating unit for applying a substantially uniform coating layer of a polymeric coating material onto the uncoated linear rebar to form a linear coated rebar; and (d) a bending unit for bending the linear coated rebar into a spiraled steel rebar product.

30. The system of claim 29, further comprising a heating unit for heating the uncoated rebar to an elevated temperature sufficient to fuse a polymeric powder.

31. The system of claim 29, wherein said polymeric powder-coating unit comprises an electrostatic spray-coating nozzle.

32. The system of claim 29, comprising upstream of said powder-coating unit (i) the abrading unit and (ii) a heater for heating the uncoated rebar.

33. The system of claim 29, further comprising a curing unit for curing the polymeric coating material on the coated rebar.

34. The system of claim 33, wherein said curing unit comprises a quench cabinet for subjecting the coated rebar to a water quench.

35. The system of claim 29, further comprising a testing unit for testing the coated rebar for coating defects.

36. The system of claim 35, wherein testing unit comprises wet sponge material, and an electrical potential generator connected electrically to said wet sponge material for charging the wet sponge material with an electrical potential.

37. The system of claim 36, wherein said testing unit further comprises an alarm unit which generates an alarm in response to detection of a coating defect by the electrically charged wet sponge material.

38. The system of claim 36, wherein said testing unit further comprises an alarm unit which generates an alarm in response to detection of a coating defect by the electrically charged wet sponge material.

39. A method of continuously coating and fabricating spiraled steel rebar product for concrete structures comprising the steps of:

(a) providing a supply coil of uncoated rebar;

(b) uncoiling the uncoated rebar from the supply coil thereof and removing coil-shape memory from the uncoiled and uncoated rebar to provide linear uncoated rebar;

(c) supplying the linear uncoated rebar to a polymeric powder-coating unit and applying a substantially uniform coating layer of a polymeric coating material onto the uncoated rebar to form a linear coated rebar;

(d) testing the linear coated rebar for coating defects by bringing the coated rebar into contact with wet sponge material charged with an electrical potential; and thereafter (e) bending the linear coated rebar into a spiraled steel rebar product.

40. The method of claim 39, wherein step (d) comprises the step (d1) generating an alarm in response to detection of a coating defect by the electrically charged wet sponge material.

41. A system for continuously coating and fabricating spiraled steel rebar product for concrete structures comprising:

(a) a rebar straightener for uncoiling uncoated rebar from a supply coil thereof and removing coil-shape memory from the uncoiled and uncoated rebar to provide linear uncoated rebar;

(b) a polymeric powder-coating unit for applying a substantially uniform coating layer of a polymeric coating material onto the uncoated linear rebar to form a linear coated rebar;

(c) a testing unit for testing the coated rebar for coating defects, wherein said testing unit comprises wet sponge material, and an electrical potential generator connected electrically to said wet sponge material for charging the wet sponge material with an electrical potential; and (d) a bending unit for bending the linear coated rebar into a spiraled steel rebar product.

* * * * *